(12) United States Patent
Tracey et al.

(10) Patent No.: US 7,496,486 B1
(45) Date of Patent: Feb. 24, 2009

(54) SYSTEM, METHOD, AND LOGIC FOR EMULATING A TAG READING ENVIRONMENT

(75) Inventors: Bryan D. Tracey, Richardson, TX (US); Daniel G. Hernandez, Frisco, TX (US); Mark Watson, Plano, TX (US); Edward F. Calvesbert, Dallas, TX (US)

(73) Assignee: GlobeRanger Corporation, Richardson, TX (US)

( * ) Notice: Subject to any disclaimer, the term of this patent is extended or adjusted under 35 U.S.C. 154(b) by 939 days.

(21) Appl. No.: 10/872,065

(22) Filed: Jun. 18, 2004

Related U.S. Application Data

(60) Provisional application No. 60/480,362, filed on Jun. 20, 2003.

(51) Int. Cl.
*G06G 7/48* (2006.01)
*G08B 13/14* (2006.01)

(52) U.S. Cl. .................. 703/6; 340/572.2; 340/572.4; 340/572.7

(58) Field of Classification Search .............. 703/2, 703/6, 22, 23; 340/572.1–572.7; 235/384
See application file for complete search history.

(56) References Cited

U.S. PATENT DOCUMENTS

| | | | |
|---|---|---|---|
| 6,342,830 B1 | 1/2002 | Want et al. ............. | 340/10.1 |
| 6,600,418 B2 | 7/2003 | Francis et al. ........... | 340/572.1 |
| 6,883,710 B2 | 4/2005 | Chung ..................... | 235/385 |
| 6,919,807 B2 | 7/2005 | Shek et al. .............. | 340/572.1 |
| 7,161,487 B1 * | 1/2007 | Tracey et al. ............ | 340/572.1 |

OTHER PUBLICATIONS

U.S. Pending Patent Application entitled "*System, Method, and Logic for Processing Raw Data Comprising Tag Identifiers*," by Bryan D. Tracey, et al., 54 total pages, filed Jun. 18, 2004.

U.S. Pending Patent Application entitled "*System, Method, And Logic For Publishing Information From A First Component To A Second Component*," by Bryan D. Tracey, et al., 59 total pages, filed Jun. 18, 2004.

*United States Patent and Trademark Office; Office Action* for U.S. Appl. No. 10/871,654, filed Jun. 18, 2004 in the name of Bryan D. Tracey, et al.; 13 pages, Mar. 31, 2006.

* cited by examiner

*Primary Examiner*—Russell Frejd
(74) *Attorney, Agent, or Firm*—Baker Botts L.L.P.

(57) ABSTRACT

Emulating a tag reading environment includes accessing a virtual tag reading system of a virtual environment. The virtual tag reading system includes a virtual antenna operable to detect virtual tags. At least one virtual tag is inserted into the virtual environment. The virtual tag is subjected to a field of the virtual antenna. A response of the virtual tag reading system to the virtual tag is monitored.

41 Claims, 5 Drawing Sheets

US 7,496,486 B1

SYSTEM, METHOD, AND LOGIC FOR EMULATING A TAG READING ENVIRONMENT

RELATED APPLICATION

This application claims benefit under 35 U.S.C. § 119(e) of U.S. Provisional Application Ser. No. 60/480,362, entitled "RFID Platform and Method of Operation," filed Jun. 20, 2003.

TECHNICAL FIELD

This invention relates generally to the field of tag management systems and more specifically to a system, method, and logic for emulating a tag reading environment.

BACKGROUND

Items may be tagged in order to record the movement of the items through a supply chain. A tag may include a tag identifier that identifies the item. A tag reader at a location may read the tag to record the presence of the item at the location. Known techniques for tracking items using tags, however, are typically inefficient or ineffective in certain situations.

SUMMARY OF THE DISCLOSURE

In accordance with the present invention, disadvantages and problems associated with previous techniques for tracking tagged items may be reduced or eliminated.

According to one embodiment of the present invention, emulating a tag reading environment includes accessing a virtual tag reading system of a virtual environment. The virtual tag reading system includes a virtual antenna operable to detect virtual tags. At least one virtual tag is inserted into the virtual environment. The virtual tag is subjected to a field of the virtual antenna. A response of the virtual tag reading system to the virtual tag is monitored.

Certain embodiments of the invention may provide some, none, or all of the following technical advantages. A technical advantage of one embodiment may be that a virtual environment may be created to test tag reading workflows. The virtual environment may be customized to emulate a variety of environments. Another technical advantage of one embodiment may be that the virtual environment can be linked to a workflow using a physical level identifier, which may provide a more realistic simulation of the workflow.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 12 of the drawings, like numerals being used for like and corresponding parts of the various drawings.

Figure 1:
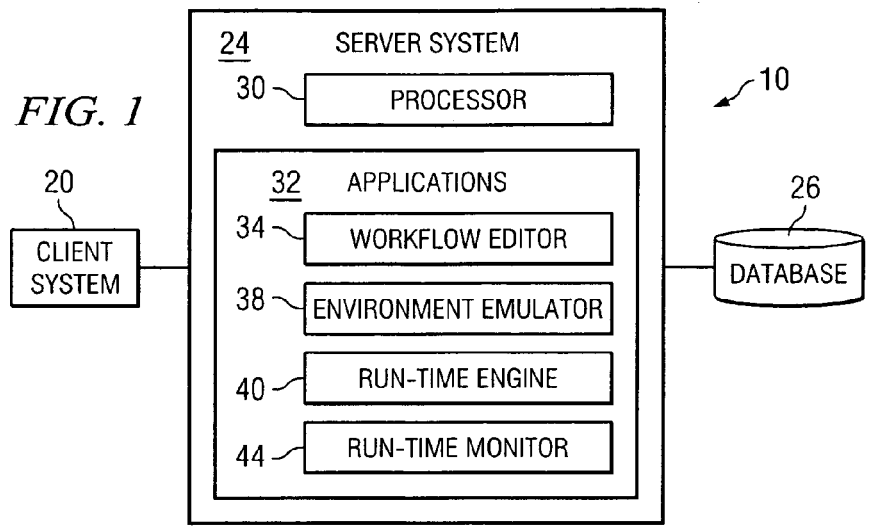
FIG. 1 is a block diagram of one embodiment of a system for processing tag reading data.

FIG. 1 is a block diagram of one embodiment of a system 10 for processing tag reading data. Tag reading data describes the response of a tag reading system to a tag. A tag may refer to a label, a strip, or other entity associated with an item. For example, a tag may be a radio frequency identification (RFID) tag that is attached to an item. An RFID tag, or transponder, typically comprises an integrated circuit that includes RF circuitry and tag information. Tag information may include a tag identifier that may also serve to identify an item associated with the tag. A tag transmits the tag information in a signal, which may be detected by a tag reading system. An active tag transmits the signal using its own power source, while a passive tag relies on a signal from the tag reading source for power to transmit.

A tag reading system may include one or more devices operable to detect a tag within a certain field. A tag reading system may include an antenna and a tag reader. An antenna may comprise a device that transmits, receives, or both transmits and receive signals, and typically receives the signal from a tag that includes tag information. A tag reader may comprise a device that collects the tag information from one or more antennas.

According to the illustrated embodiment, system 10 includes a client system 20, a server system 24, and a database 26 coupled as shown. According to one embodiment, client system 20 allows a user to communicate with a server system 24 to process tag reading data. Server system 24 includes a processor 30 that manages applications 32 that may be used to process tag reading data. A processor may comprise a device operable to process input according to predefined rules to generate output.

According to the illustrated embodiment, applications 32 include a workflow editor 34, an environment emulator 38, a run-time engine 40, and a run-time monitor 44. Workflow editor 34 may be used to create and modify tag reading workflows. A tag reading workflow may describe steps for processing tag reading data. A workflow may include a set of components linked by one or more directional relationships. A component may include source code or other software that operates as a modular entity in a process environment. A component may operate to implement an interface within a workflow. A directional relationship links a first component to a second component. For example, a directional relationship may describe a publication-subscription relationship by linking a publisher component to a subscriber component. Workflow editor 34 is described in more detail with reference to FIG. 2.

Environment emulator 38 may be used to create a virtual environment that may be used to test a workflow. An environment may comprise hardware and software such as an operating system that may be used to run a computer program. A virtual environment refers to a computer-simulated environment that emulates a physical environment. Environment emulator 38 is described in more detail with reference to FIG. 3.

Run-time engine 40 runs workflows and instantiates the components of a workflow. Instantiation of a component may refer to making a component available as an active publisher, subscriber, or both a publisher and subscriber (that is, a filter). According to one embodiment, run-time engine 40 may provide the components of a workflow with subscription data during instantiation. Subscription data describes the publication-subscription relationship between a publisher and a subscriber. The subscription data may identify subscribers and instruct a particular publisher to send information to its associated subscribers. According to one embodiment, run-time engine 40 may receive instruction to instantiate a component. Run-time engine 40 retrieves the subscription data corresponding to the component from database 26, and sends the subscription data to the component when the component is instantiated.

Run-time monitor 44 monitors the execution of the workflows by run-time engine 40. The monitoring results may be displayed at client system 20 or stored at database 26. Run-time monitor 44 is described in more detail with reference to FIGS. 4A and 4B.

Client system 20 and server system 24 may each operate on one or more computers and may include appropriate input devices, output devices, mass storage media, processors, memory, or other components for receiving, processing, storing, or communicating information according to the operation of system 10. For example, the present invention contemplates the functions of both client system 20 and server system 24 being provided using a single computer system, for example, a single personal computer.

Database 26 stores and facilitates retrieval of information used by server system 24. Database 26 may include any hardware, software, firmware, or combination of the preceding for storing and facilitating retrieval of information. Also, database 26 may use any of a variety of data structures, arrangements, or compilations to store and facilitate retrieval of information.

Modifications, additions, or omissions may be made to system 10 without departing from the scope of the disclosure. Any combination of client system 20, server system 24, or database 26 may be integrated or separated according to particular needs. If any combination of client system 20, server system 24, or database 26 are separated, the separated components may be coupled to each other using a local area network (LAN), a metropolitan area network (MAN), a wide area network (WAN), a global computer network such as the Internet, or any other appropriate wire line, wireless, or other link.

The operations of system 10 may be performed by more, fewer, or other modules. For example, the operations of run-time engine 40 and run-time monitor 44 may be performed by one module, or the operations of workflow editor 34 may be performed by more than one module. Additionally, operations of system 10 may be performed using any suitable logic comprising software, hardware, other logic, or any suitable combination of the preceding. As used in this document, "each" may refer to each member of a set or each member of a subset of a set.

Figure 2:
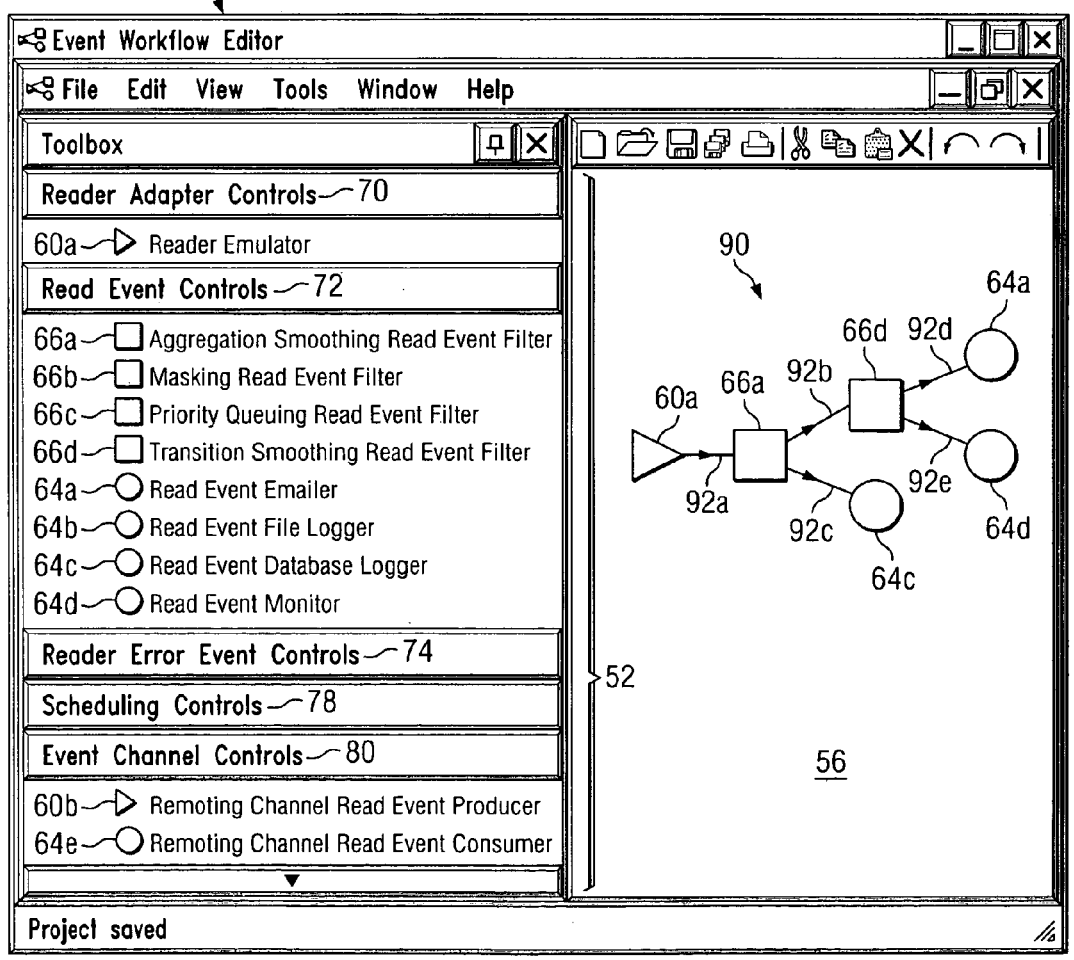
FIG. 2 illustrates one embodiment of a graphical user interface for creating a workflow that may be used with the workflow editor of the system of FIG. 1.

FIG. 2 illustrates one embodiment of a graphical user interface 50 for creating a workflow that may be used with workflow editor 34 of system 10 of FIG. 1. Interface 50 includes a component menu 52 and a canvas 56. Components may be selected from component menu 52 and dragged to canvas 56 in order to create a workflow. As a component is dragged, a properties window may appear in which the properties of the component may be entered.

A component may be a producer, a filter, or a consumer. According to the illustrated embodiment, producers 60 are identified by a triangular shape, filters 64 are identified by a square shape, and consumers 66 are identified by a circular shape.

A producer 60 may refer to a component that collects information. As an example, a producer 60 may represent a device such as a reader that reads a tag and generates information representing the tag. The producer 60 may listen to or poll a device through a device adapter to gather information such as an array of tag identifiers and a reader identifier. The producer 60 may then generate a read event and send the read event to a filter 64 or consumer 66 subscribing to the producer 60.

A filter 64 may refer to a component that processes information, and operates as both a producer 60 and a consumer 66. Typically, a filter 64 consumes an event received from a producer 60, processes the received event according to business rules, generates another event comprising the processed data, and sends the generated event to another filter 64 or a consumer 66 subscribing to the filter 64.

A consumer 66 may refer to a component that receives information. A consumer 66 consumes events according to its business rules, and may perform a predefined response. The response may be to send data or a notification to a specified destination. The response may also be, for example, to log an event to a file or to send an electronic mail notification, alert, or alarm to a recipient.

Component menu 52 arranges the components according to the type of control they provide, for example, reader adapter controls 70, read event controls 72, reader error event controls 74, scheduling controls 78, event channel controls 80, other suitable control, or any combination of the preceding.

Reader adapter controls 70 include components configured for specific types of readers. For example, reader adapter controls 70 may include components for a TEXAS INSTRUMENTS reader, a MATRIX reader, an ALIEN NANOSCANNER reader, other suitable reader, or any combination of the preceding. According to the illustrated example, reader adapter controls 70 include a reader emulator 60a. A reader emulator 60a may be a component that can be linked to a virtual reader of a virtual environment.

According to one embodiment, a producer or other component may be linked to a device by specifying a physical level identifier for the device as a property of the producer. A physical level identifier identifies a device at the physical level, and may include, for example, an IP address and a port identifier. The IP address identifies the device from which a component may receive an event, and the port identifier identifies the port on which the server should listen for an event.

Read event controls 72 include components that process and record tag reading data. Examples of read event controls 72 include an aggregation smoothing reader event filter 66a, a masking read event filter 66b, a priority queuing read event filter 66c, a transition smoothing read event filter 66d, a read event emailer 64a, a read event file logger 64b, a read event database logger 64c, a read event monitor 64d, other suitable control, or combination of the preceding.

Aggregation smoothing read event filter 66a smoothes raw data. A reader may introduce skew into the raw data. Filter 66a filters the raw data to minimize the skew. Masking read event filter 66b masks specified tag identifiers. Priority queuing read event filter 66c queues read events according to priority. Transition smoothing read event filter 66c smoothes raw data over a specified time interval. A tag may be detected multiple times as it passes through the field of a tag reading system. Each time the tag is detected may be referred to as a detection event. For multiple detection events, a tag identifier for a single tag may be collected multiple times. Data may be smoothed to remove the repeated tag identifiers to yield unique tag identifiers, each representing different tags.

Read event emailer 64a sends an electronic mail notification to a recipient. Destination information such as the electronic mail address for the recipient may be specified for emailer 64a. Read event file logger 64b logs data into a file. Destination information may include a path and file name. Read event database logger 64c logs data into a database. Read event monitor 64d sends information to an event monitor application.

Reader error event controls 74 include components that respond to reader errors. Examples of reader error event controls 74 include an error event logger, an error event emailer, and an error handler. An error event logger logs reader errors into a file. An error event emailer notifies a recipient when a reader error occurs. An error handler disables a reader when an error occurs.

Scheduling controls 78 include components that instruct components when to perform tasks based on a schedule. Examples of scheduling controls 78 include a schedule producer. A schedule producer may notify schedule event consumers 66 when to perform tasks.

Event channel controls 80 allow for workflows to be linked across platforms. Examples of event channel controls 80 include a remoting channel read event producer 60b and a remoting channel read event consumer 64e. A remoting channel read event consumer 64e consumes a read event and sends the event to a remoting channel read event producer 64b running a different workflow.

Canvas 56 provides a work space within which a workflow may be created. A work space may refer to an area into which components may be inserted to create a workflow. Publication-subscription relationships may be defined as workflow 90 is created. For example, a user may drag a first component and a second component to canvas 56. The user may then draw an arrow 92 from the first component to the second component to indicate that the first component publishes information to the second component. Subscription data describing the publication may be maintained at the first component.

According to the illustrated embodiment, canvas 56 displays an example workflow 90 generated from components selected from component menu 52. Example workflow 90 includes a reader emulator 60a coupled to an aggregation smoothing read event filter 66a by arrow 92a. Filter 66a is coupled to transition smoothing read event filter 66d by arrow 92b and to read event database logger 64c by arrow 92c. Filter 66d is coupled to read event emailer 64a by arrow 92d, and to read event monitor 64d by arrow 92e.

Modifications, additions, or omissions may be made to graphical user interface 50 without departing from the scope of the disclosure. Interface 50 may include more, fewer, or other graphical elements. Additionally, the graphical elements may be arranged in any suitable configuration without departing from the scope of the disclosure.

Figure 3:
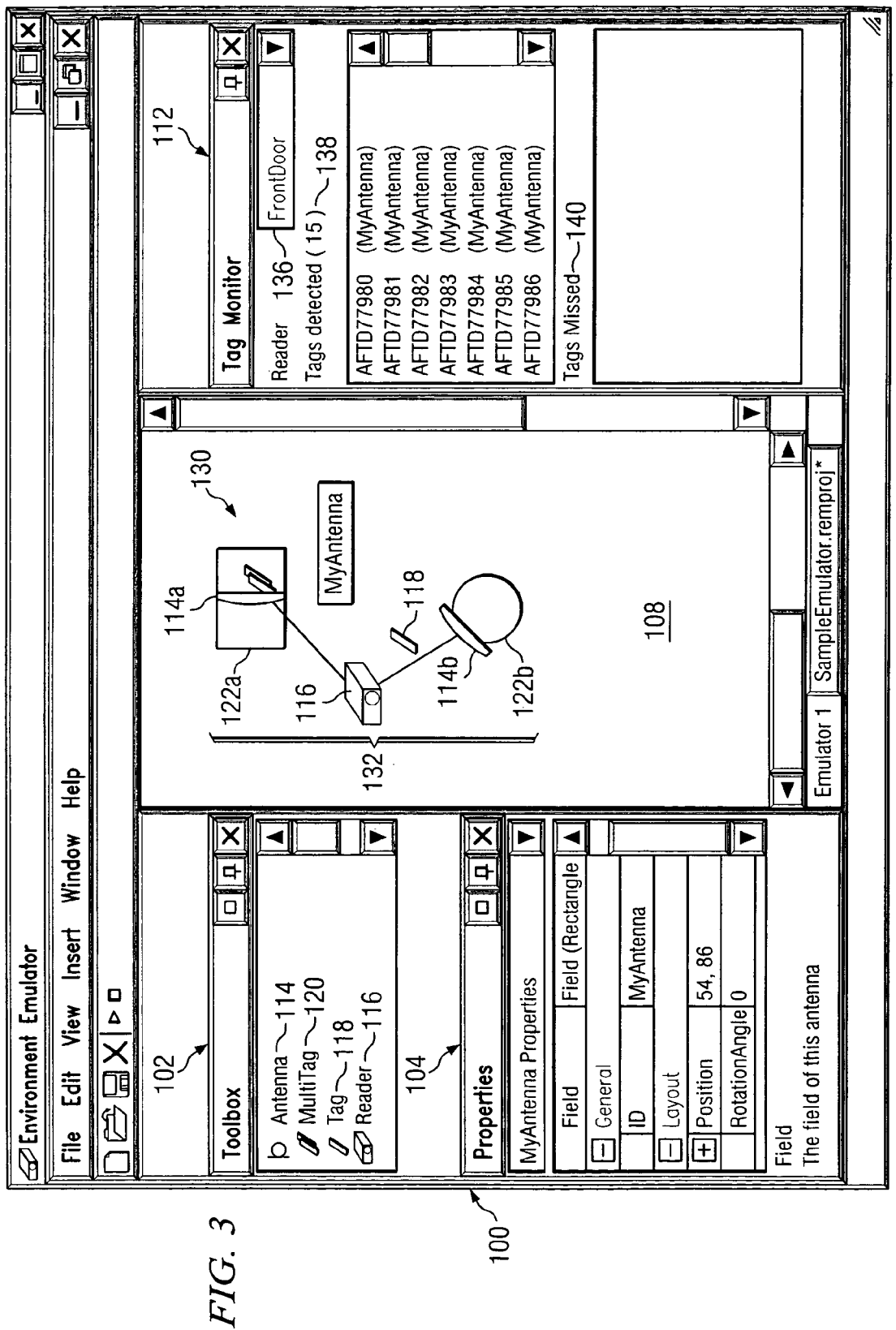
FIG. 3 illustrates one embodiment of a graphical user interface for emulating an environment that may be used with the environment emulator of the system of FIG. 1.

FIG. 3 illustrates one embodiment of a graphical user interface 100 for emulating an environment that may be used with environment emulator 38 of system 10 of FIG. 1. Interface 100 may be used to create a virtual environment in which a workflow may be executed. According to the illustrated embodiment, interface 100 includes a toolbox 102, a properties section 104, a canvas 108, and a tag monitor 112. Toolbox 102 includes tools that may be used to create a virtual environment on canvas 108. Properties section 104 may be used to define properties of the tools. Tag monitor 112 may be used to monitor the virtual environment.

According to the illustrated embodiment, toolbox 102 includes an antenna tool 114, a reader tool 116, a tag tool 118, and a multi-tag tool 120. Any number of reader tools 116 and antenna tools 114 may be linked together to generate a tag reading system 132. Antenna tool 114 simulates the operation of a physical antenna that detects the presence of tags within its field 122. A field may refer to the area within which a tag may be detected by an antenna. Field 122 of antenna tool 114 may be defined to have any suitable size or shape. Reader tool 116 simulates the operation of a physical reader by detecting the movement of tag tools 118 through field 122 of antenna tool 114 linked to reader tool 116. Reader tool 116 may be coupled to any suitable number of antenna tools 122. According to one embodiment, a reader tool 116 may, be identified by a physical level identifier, such as an IP address and a port identifier.

Tag tool 118 simulates a single tag that can be moved through field 122 to be detected by a reader tool 116. Multi-tag tool 120 simulates a group of tags that can be moved simultaneously through field 122. The number of tags in a group may be specified. Unique type identifiers may be automatically generated for each tag. According to one embodiment, toolbox 102 may include different types of tag tools 118 to represent different types of tags.

A tag reading macro may record the process of moving a tag tool 118 through field 122 for one or more iterations. The tag reading macro recording multiple iterations may be called on to, for example, perform load testing. Load testing may test the operation of system 10 of FIG. 1 to handle multiple groups of one or more tags moving through the system 10 at separate times. According to one embodiment, unique tag identifiers may be automatically generated at each iteration. For example, during the first iteration of the tag reading macro, a group of three tags may have tag identifiers 1, 2, and 3. During the next iteration, the tags may have tag identifiers 4, 5, and 6. In this regard, unique tag identifiers may be generated.

Properties 104 describe the tools of toolbox 102. Properties of tag reading system 132 may describe the capability of system 132 to read a tag. Properties of reader tool 116 may include, for example, a reader name, a physical level identifier, an error value, other property, or any combination of the preceding. An error value estimates the probability of a reader failing to detect a tag, and may be expressed as a percentage of the number of tags missed over the total number of tags. Properties of antenna tool 114 may include, for example, a physical level identifier, the frequency range of tags that the antenna can read, other property, or any combination of the preceding.

Properties of tag tool 118 may include, for example, a tag identifier, a radio frequency of the tag, other property, or any combination of the preceding. The radio frequency of a tag tool 118 may need to be within the frequency range of an antenna tool 114 in order for antenna tool 114 to be able to read tag tool 118. Properties of multi-tag tool 120 may include, for example, a start tag identifier value, a quantity of tags per group, other property, or any combination of the preceding. A start tag identifier value specifies the initial value for a tag identifier, and a quantity of tags per group specifies the number of tags to generate per group.

Canvas 108 displays an example environment 130 that includes a tag reading system 132 and a tag tool 118. Tag reading system 132 includes reader 116 and antennas 114. The process by which tag reading system 132 reads tag tool 118 may be simulated by dragging tag tool 118 through an antenna field 122 of an antenna 114. Any number or combination of tools may be arranged on canvas 108 in any suitable manner to create a virtual environment.

Tag monitor 112 monitors the response of tag reading system 132 to tag tools 118 and 120. Monitoring may refer to determining if tag reading system 132 has detected tag tools 118 and 120, and does not in any way require or exclude a user viewing the process. Tag monitor 112 may include a reader selector 136, a tags detected display 138, and a tags missed display 140. Reader selector 136 may be used to select a specific reader 116 of tag reading system 132 to monitor. Tags detected display 138 displays the identifiers of tags detected by tag reading system 132. Tags missed display 140 displays the identifiers of tags that were missed by tag reading system 132.

To run a simulation according to one embodiment, a workflow may be selected using workflow editor interface 50. The physical level identifier, such as the IP address and port identifier, of reader emulator 60a may be set to match that of reader 116. As tag tool 118 is moved through field 122 of antennas 114, reader 116 detects the tags and generates a read event that is received by reader emulator 60a. The read event is processed according to the workflow. To the workflow, the virtual environment appears to be a physical environment. In this regard, the operation of a workflow in a virtual environment may be determined in order to test the effectiveness of the workflow.

Modifications, additions, or omissions may be made to interface 100 without departing from the scope of the disclosure. Interface 100 may include more, fewer, or other graphical elements. Additionally, the graphical elements may be arranged in any suitable configuration without departing from the scope of the disclosure.

As an example, toolbox 102 may include more, fewer, or other tools. For example, toolbox 102 may include business tools such as a pallet tool, a forklift tool, a label tool, a label printer tool, other tool, or any combination of the preceding. A pallet tool represents a pallet of a warehouse where items may be stored. A forklift tool represents a forklift that may be used to move items from one location to another location. A label tool represents a label that may be attached to an item and may include a tag. A label printer tool represents a label printer used to generate labels.

The business tools may be used to test a label printing workflow. The label printing workflow may include a label identifier producer that uses a purchase order to determine label identifiers to be printed on labels. The label identifier producer may send the label identifiers to a list generating filter that generates a list of the label identifiers.

The list generating filter sends the list to a label printer consumer that prints the label identifiers on labels. The list generating filter may also send the list of label identifiers to a label identifier reconciler filter. A label reader producer scans the label identifiers from the printed labels, and sends the scanned labels to the label identifier reconciler filter. The label identifier reconciler compares the list of label identifiers with the scanned label identifiers to reconcile the printed labels with the purchase order.

Figure 4A:
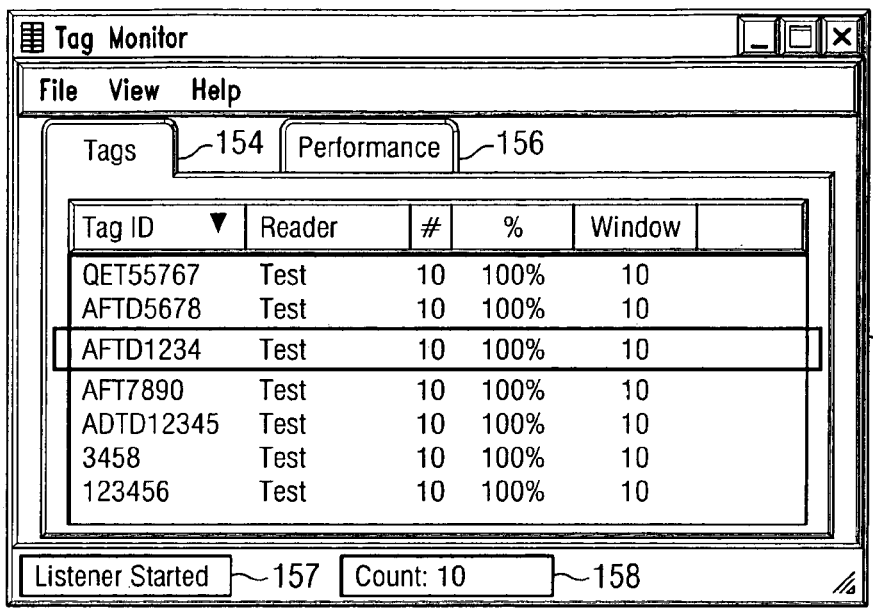
FIGS. 4A and 4B illustrate one embodiment of an interface for a tag monitor.
Figure 4B:
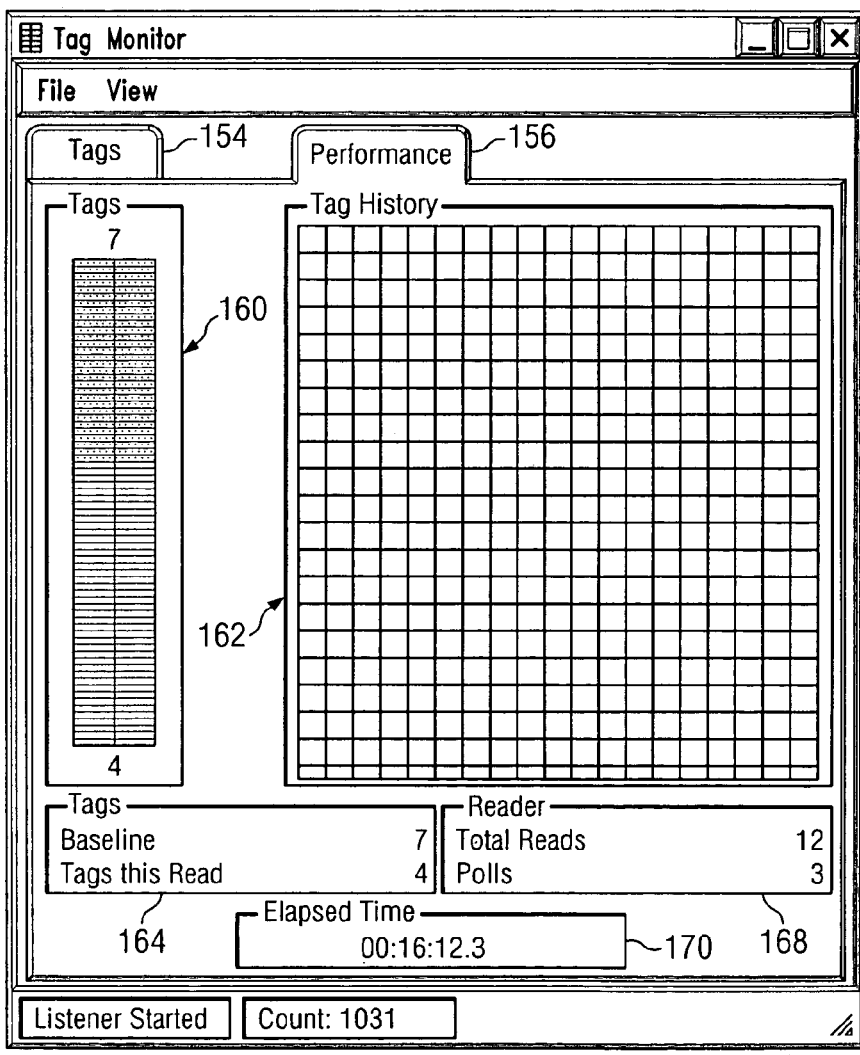

FIGS. 4A and 4B illustrate one embodiment of an interface 150 for a tag monitor. Interface 150 displays read events in real time and maintains a history of events that occurred across time. Referring to FIG. 4A, interface 150 includes a tags tab 154 and a performance tab 156. Tags tab 154 describes tags that have been read. Tags tab 154 displays the tag identifiers of tags that were read, a reader identifier of the reader that read the tags, the number of times that each tag was read, the percentage of successful reads during a window of reads, and the number of reads within the window of reads. A listener started window 157 indicates whether the listener has been started, and a count window 158 displays the number of times the tag count has been updated.

Referring to FIG. 4B, performance tab 156 describes the history of read events. Performance tab 156 includes a tag bar graph 160, a tag history 162, a tag dialog box 164, a reader dialog box 168, and an elapsed time display 170. Tag bar graph 160 indicates the number of tags read with respect to a pre-determined baseline. According to the illustrated embodiment, four tags have been read with respect to a baseline of seven tags. Tag history 162 displays a graph that charts the quantity of tags read per read event. Tag dialog box 164 displays the baseline number of tags and the number of tags that have been read. Reader dialog box 168 displays the number of polls and the total number of reads during the polls. According to the illustrated example, twelve reads were made during three polls. Elapsed time window 170 displays the elapsed time during which the read events occurred.

Modifications, additions, or omissions may be made to interface 150 without departing from the scope of the disclosure. Interface 150 may include more, fewer, or other graphical elements. Additionally, the graphical elements may be arranged in any suitable configuration without departing from the scope of the disclosure.

Figure 5:
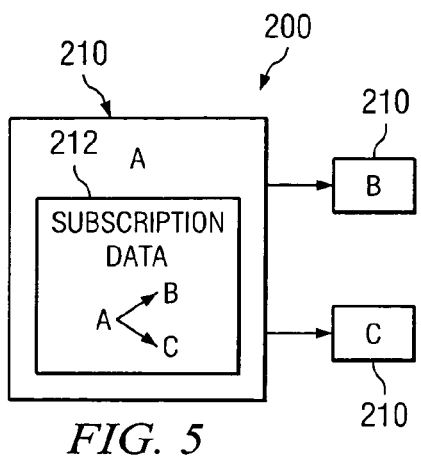
FIG. 5 is a diagram that illustrates one embodiment of a method for publishing information to components.

FIG. 5 is a diagram 200 that illustrates one embodiment of a method for publishing information to components 210. According to the illustrated embodiment, components B and C subscribe to component A, which publishes information to components to B and C in accordance with the subscription. A publisher may refer to a component that provides information to one or more subscribers, and a subscriber may refer to a component that registers to receive information from one or more publishers.

Component A includes subscription data 212. Subscription data 212 describes the publication-subscription relationship between publishers and subscribers. The subscription data 212 of a publisher may specify the subscribers that subscribe to the publisher. According to the illustrated embodiment, subscription data 212 indicates that components B and C subscribe to component A. Accordingly, components 210 do not require a controller that routes published information from publisher component A to subscriber components B and C.

Subscription data 212 may also specify the type of information to be sent to each subscriber. For example, a publisher may send a notification including certain types of information to a subscriber. Subscription data 212 may also specify when information is to be sent to the subscriber. For example, information may be sent on a periodic basis or may be sent in response to a trigger event. As an example, subscription data 212 may be saved in an XML file.

Publisher component A may receive subscription data 212 during instantiation of the component by, for example, runtime engine 40. Publisher component A may be instantiated at any suitable time. For example, component 210 may be instantiated when a workflow that includes component 210 is initialized. As another example, component may be instantiated when an instantiation trigger event occurs. An instantiation trigger event may refer to an event that requires a change in the subscription data 212, such as when a threshold is violated.

Modifications, additions, or omissions may be made to diagram 200 without departing from the scope of the disclosure. Diagram 200 may include more, fewer, or other components 210. Additionally, the components may be arranged in any suitable configuration with any suitable publication-subscription relationships without departing from the scope of the disclosure.

Figure 6:
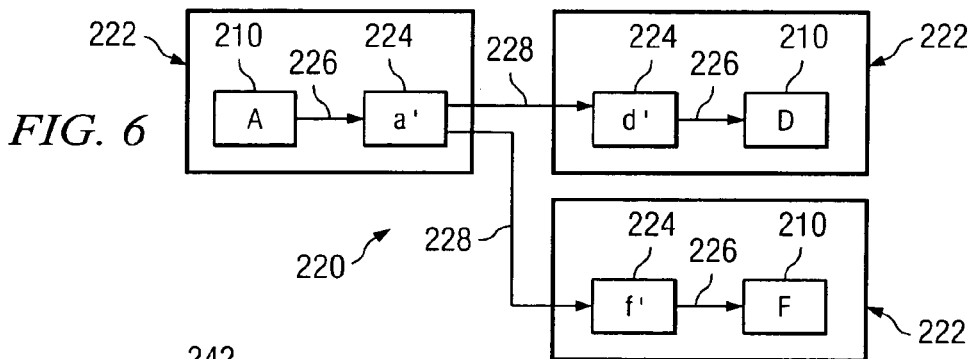
FIG. 6 is a diagram illustrating components communicating using proxies.

FIG. 6 is a diagram 220 illustrating components 210 communicating using proxies 224. Components 210 may reside in the same or different applications spaces 222 depending on how they are used. An application space 222 may refer to a protected memory environment in which an application may run so that the application does not interfere with other applications. A proxy 224 may refer to a component that may be used to communicate between components 210 of different application spaces 222. A proxy 224 may be associated with a specific format, connection, or both connection and format, and may be designed to handle any number of formats, connections, or both. A format may refer to a communication format, and a connection may refer to a physical level connection.

A proxy 224 may communicate information to or from a component 210 in the same one application space 222 using direct application programming interface (API) communication 226. Proxy 224 may then convert the information to a format of a different application space 222 to communicate the information to a component 210 of the other application space 222. Proxy 224 may communicate with the other application space 222 using a remote procedure call 228. For example, remote procedure call 228 may represent .NET remoting, WEB SERVICES, MOBILE WEB SERVICES, or other suitable format.

According to one embodiment, a designer may be responsible for creating components 210, and proxies 224 may be generated to allow components 210 to be used in any suitable environment. Proxies 224 may be created by a user or may be automatically generated in response to creating component 210 and based on the applicable environment.

Modifications, additions, or omissions may be made to diagram 220 without departing from the scope of the disclosure. Diagram 220 may include more, fewer, or other components 210 or proxies 224. Any suitable number of proxies may be used between components 210. Additionally, components 210 and proxies 224 may be arranged in any suitable configuration without departing from the scope of the disclosure.

Figure 7A:
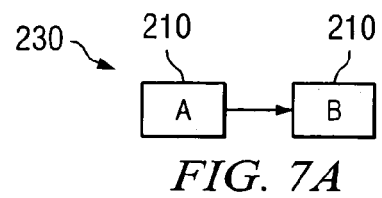
FIGS. 7A and 7B are diagrams illustrating a component and a cloned component.
Figure 7B:
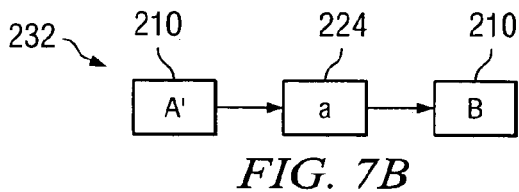

FIGS. 7A and 7B are diagrams 230 and 232 illustrating a component 210 and a cloned component 210. Diagram 230 illustrates component A communicating with component B. Diagram 232 illustrates a cloned component A' that has been cloned from component A to operate in a different environment. The cloned component A' maintains the subscription data 212 of component A. Proxy a may be used to communicate between components A' and B. According to one embodiment, component A may be created, and then cloned to generate components A' that may be used in other environments.

Figure 8:
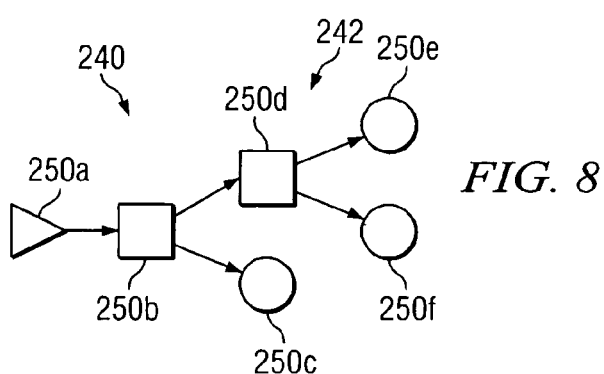
FIG. 8 is a diagram illustrating a workflow that may be deployed in different environments.

FIG. 8 is a diagram 240 illustrating a workflow 242 that may be deployed in different environments using components 250. Components 250 may be substantially similar to components 210. According to the illustrated embodiment, components 250e and 250f subscribe to component 250d, components 250c and 250d subscribe to component 250b, and component 250b subscribes to component 250a.

The subscription data of the components 250 is maintained by the components 210 as workflow 242 is deployed in different environments. Accordingly, a designer may design workflow 242 having components 250 with subscription data. Workflow 242 may be deployed in a first environment such that the components 250 maintain the subscription data. Workflow 242 may then be deployed in a second environment such that the components 250 maintain the subscription data. Accordingly, workflow 242 may be designed once, and then deployed in multiple environments.

According to the illustrated embodiment, workflow 242 includes components 250. Deployment may refer to associating components 250 of workflow 242 other components or to entities that perform the operations of components 250. Deployment may include mapping a component 250 to a physical level identifier. The physical level identifier may represent a physical device, a virtual device, software code, or other entity operable to perform the operations of a component. As an example, reader emulator 60a of workflow 90 of FIG. 2 may be associated with virtual reader tool 116 of virtual environment 130 of FIG. 3 by mapping the physical level identifier of reader tool 116 to reader emulator 60a.

Mapping may create different configurations of workflow 242. For example, a component 250 may be mapped to a single component identifier to create one configuration or to multiple component identifiers to create another configuration. Examples of different configurations are described in more detail with reference to FIGS. 9A and 9B.

Figure 9A:
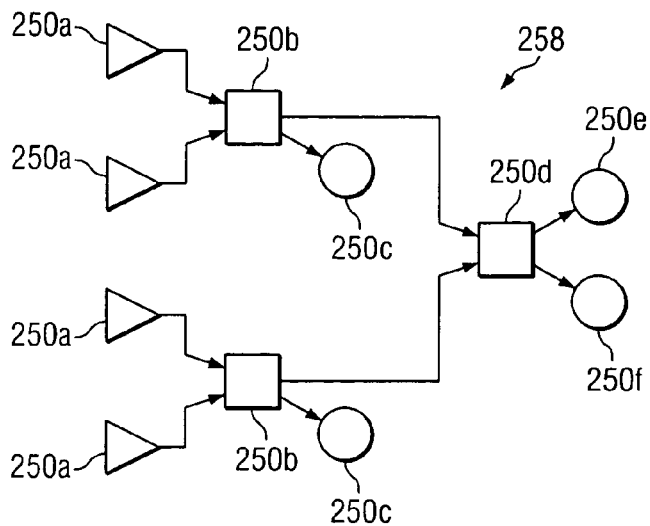
FIG. 9A is a diagram illustrating an example deployment of the workflow of FIG. 8.

FIG. 9A is a diagram 258 illustrating an example deployment of workflow 242 of FIG. 8. According to the illustrated embodiment, component 250a is mapped to four physical level identifiers, where each physical level identifier identifies a reader of a tag reading system. Each component 250b is mapped to two components 250a, and component 250d is mapped to two components 250b to generate the resulting configuration. In the deployment, components 250 maintain their subscription data. That is, components 250e and 250f subscribe to component 250d, components 250c and 250d subscribe to components 250b, and components 250b subscribe to components 250a.

Workflow 242 may be mapped in a different manner to create a different configuration. A component may be mapped to more or fewer physical level identifiers. For example, component 250a may be mapped to five physical level identifiers.

Figure 9B:
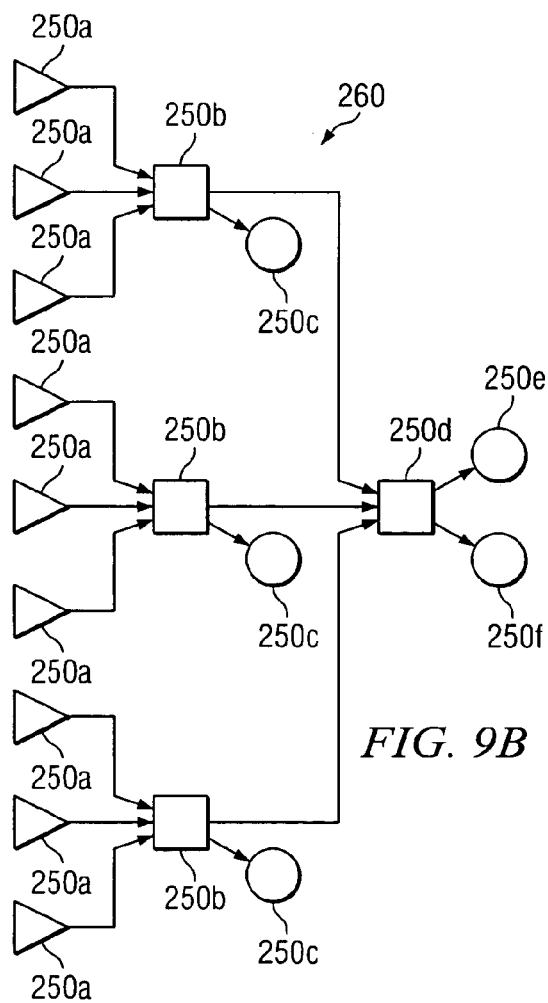
FIG. 9B is a diagram illustrating another example deployment of the workflow of FIG. 8.

FIG. 9B is a diagram 260 illustrating another example deployment of workflow 242 of FIG. 8. According to the illustrated embodiment, component 250a is mapped to nine physical level identifiers, where each physical level identifier identifies a reader of a tag reading system. Each component 250b is mapped to three components 250a, and component 250d is mapped to three components 250b to generate the resulting configuration. In the deployment, components 250 maintain their subscription data. That is, components 250e and 250f subscribe to component 250d, components 250c and

250*d* subscribe to components 250*b*, and components 250*b* subscribe to components 250*a*.

Figure 10:
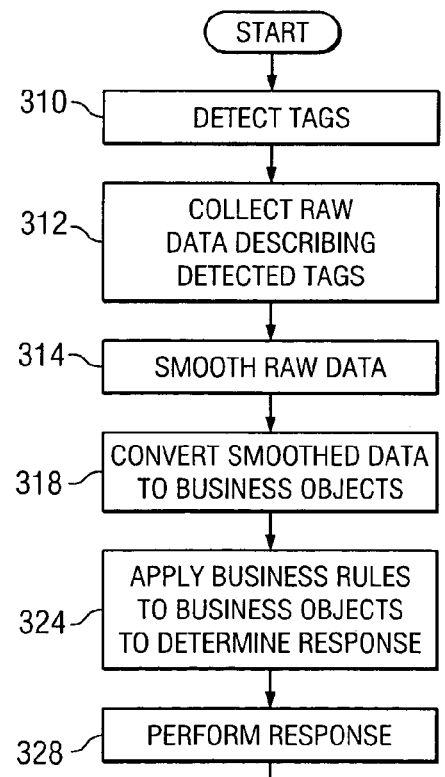
FIG. 10 is a flowchart illustrating one embodiment of a method for processing tag reading data.

FIG. 10 is a flowchart illustrating one embodiment of a method for processing tag reading data. The method begins at step 310, where tags are detected. The tags may be detected by a tag reading system that detects tags at detection events. A detection event may refer to an event during which tag information such as a tag identifier is received from a tag.

Raw data describing the detected tags is collected at step 312. Raw data may refer to data received directly from a reader. Raw data may include, for example, tag identifiers of the tags that have been read; the date and the time that each tag was read; the reader identifier and the antenna identifiers that read each tag; other suitable information; or any combination of the preceding. The reader may detect a tag multiple times as the tag passes through the field of the system. The tag identifier for the tag may be collected each time, yielding repeating tag identifiers. As an example, the tags with identifiers T1 and T2 may be detected during detection events p1, p2, and p3. Tag identifiers {T1,T2} are collected at event p1, tag identifier {T1} is collected at event p2, and tag identifiers {T1,T2} are collected at event p3.

The raw data is smoothed at step 314. According to one example, the raw data may be smoothed across predetermined smoothing intervals. A smoothing interval may include one or more successive detection events. Data may be smoothed over a smoothing interval to remove the repeated tag identifiers. The repeated tag identifiers may be removed by selecting the unique tag identifiers, which may be given by the union of the collected tag identifiers. For example, a smoothing interval may include detection events p1, p2, and p3 described above. The union of the collected tag identifiers {T1,T2} yields the unique tag identifiers.

The smoothed data is converted to business objects at step 318. A business object may refer to a software object that can be processed by a business rule. Smoothed tag identifiers may be converted to an object to which a business rule may be applied. For example, the tag identifiers {T1,T2} may be converted to "two units of product X have been received." The unique tag identifiers may be converted using a lookup table that associates unique tag identifiers to their corresponding business objects.

Business rules are applied to the business objects to determine a response at step 324. A business rule may be a function that is used to determine a response to particular input. A response may be any suitable action such as sending a notification, submitting an order, storing data in a database, other action, or any combination of the preceding. A business rule may be expressed as "If A occurs, then do B," such as "If two units of product X have been received, send a notification to an event consumer." The response is performed at step 328. For example, an electronic mail message may be sent to a destination address. After performing the response, the method terminates.

Modifications, additions, or omissions may be made to the method without departing from the scope of the disclosure. The method may include more, fewer, or other steps. Additionally, steps may be performed in any suitable order without departing from the scope of the disclosure.

Figure 11:
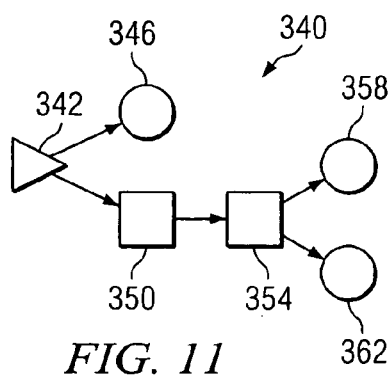
FIG. 11 illustrates an example workflow for tracking the movement of items of a product through a portal.

FIG. 11 illustrates an example workflow 340 for tracking the movement of items of a product through a portal. A product may refer to a set of similar items that flow through a supply chain. Example workflow 340 may describe a situation in which tagged items pass through a portal to move from one location to another location. A portal may comprise an opening that has a tag reading system that detects tags moving through the opening. As an example, workflow 340 describes tagged items passing through a door opening to move from one area to another area, such as from a receiving dock to a store room. When an item enters the store room, the event is logged into a file and an electronic mail notification is sent.

Workflow 340 includes components 342, 346, 350, 354, 358, and 362 coupled as shown. A reader adapter 342 collects raw data describing the response of the tag reading system to tags, and generates tag read events describing the raw data. Remoting channel portal event consumer 346 consumes the read events, and, according to one embodiment, sends the read events to a remoting channel portal event producer of another workflow. Remoting channel portal event consumer 346 facilitates distributed processing between workflow 340 and another workflow.

A transition smoothing read event filter 350 smoothes the raw data across a predetermined transition interval. A transition interval may refer to a smoothing interval that represents the estimated amount of time it takes for a tag to pass through the field of the tag reading system. For example, a person carrying ten tagged items may take up to two seconds to pass through the field. In this example, the transition interval may be two seconds.

A portal event filter 354 transforms the smoothed data into portal events. Portal event filter 354 listens for tag read events and registers to receive one event each time a new tag has been read. Filter 354 extracts tag read information from the tag read events. Tag read information may include, for example, the items, the person going through the portal, and the origination and destination points of the items. Filter 354 generates portal events describing the items from the tag read information.

A portal event file logger 358 records information about the items. Portal event file logger 358 listens for portal events. When logger 358 receives a portal event, logger 358 writes the event to an XML file in a predetermined directory of a database. A portal event emailer 362 sends notifications about the items. Portal event emailer 362 listens for portal events. When emailer 362 receives a portal event, emailer 362 sends an electronic mail message describing the portal event to designated recipients.

Modifications, additions, or omissions may be made to workflow 340 without departing from the scope of the disclosure. Workflow 340 may include more, fewer, or other components. Additionally, the components may be arranged in any suitable configuration without departing from the scope of the disclosure.

Figure 12:
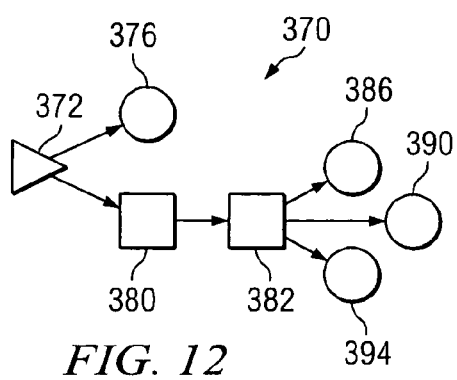
FIG. 12 illustrates an example workflow for tracking movement of items of a product into and out of an item detection area such as a shelf.

FIG. 12 illustrates an example workflow 370 for tracking movement of items of a product into and out of an item detection area such as a shelf. An item detection area may comprise an area where the items of a product are constantly monitored by a tag reading system for movement into or out of the area. Workflow 370 may be used in a situation in which tagged items on a shelf are constantly monitored. As tagged items are placed on or removed from the shelf, data recording shelf activity is logged into a file, and designated recipients are notified when a product needs to be restocked or is out of stock.

Workflow 370 includes a reader adapter 372. As items are placed in or removed from the item detection area, reader adapter 372 collects raw data and generates read events from the raw data. Reader adapter 372 may poll the tag reading system at regular intervals, such as once every one to two seconds, for changes in the number of items in the item detection area. A remoting channel portal event consumer 376 consumes a read event and, according to one embodiment, sends the read event to a remoting channel portal event producer running in a different workflow.

An aggregation smoothing read event filter 380 smoothes the raw data. The tag identifiers are smoothed over a configurable number of reads. A product quantity event filter 382 generates product quantity events that describe the quantity of the product in stock in an inventory. A product quantity may refer to the number of items of a product. Product quantity event filter 382 listens for read events. Once product quantity event filter 382 receives a read event, it applies business rules to calculate the product quantity from the previous quantity of the product. Filter 382 may provide a product quantity event that includes product information. The product information may include a product identifier along with the product quantity.

A product quantity event file logger 386 listens for a product quantity event. When logger 386 receives a product quantity event, it writes the event to an XML file in a predetermined directory of a database. A product out-of-stock emailer 390 sends a notification when a product reaches an out-of-stock threshold, for example, when the product quantity is zero. Product out-of-stock emailer 390 registers to receive product quantity events only when the product quantity is zero. When emailer 390 receives such an event, it sends an electronic mail message to designated recipients. An emailer or other component may be configured to send a notification when the product quantity reaches any suitable type of threshold.

A product restock emailer 394 sends a notification when a product needs to be restocked, that is, when the quantity of a product reaches a restock threshold. Product restock emailer 394 registers to receive a product quantity event when the product quantity is less than the restock threshold. When emailer 394 receives such an event, it sends an electronic mail notification to designated recipients.

Modifications, additions, or omissions may be made to workflow 370 without departing from the scope of the disclosure. Workflow 370 may include more, fewer, or other components. Additionally, the components may be arranged in any suitable configuration without departing from the scope of the disclosure.

Certain embodiments of the invention may provide some, none, or all of the following technical advantages. A technical advantage of one embodiment may be that a virtual environment may be created to test tag reading workflows. The virtual environment may be customized to emulate a variety of environments. Another technical advantage of one embodiment may be that the virtual environment can be linked to a workflow using a physical level identifier, which may provide a more realistic simulation of the workflow.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for emulating a tag reading environment, comprising:
   using a computer system, accessing a virtual tag reading system of a virtual environment, the virtual tag reading system comprising a virtual antenna operable to detect a plurality of virtual tags;
   inserting at least one virtual tag into the virtual environment;
   subjecting the at least one virtual tag to a field of the virtual antenna;
   monitoring a response of the virtual tag reading system to the at least one virtual tag; and
   storing information associated with the monitored response.

2. The method of claim 1, further comprising:
   accessing a tag reading workflow; and
   executing the tag reading workflow in the virtual environment.

3. The method of claim 1, wherein the virtual tag reading system further comprises a virtual reader that is identified by a physical level identifier.

4. The method of claim 3, further comprising:
   accessing a tag reading workflow comprising a reader emulator component; and
   setting the reader emulator component to a physical level identifier corresponding to the virtual reader.

5. The method of claim 1, wherein:
   the field of the virtual antenna is associated with an item detection area; and
   subjecting the at least one virtual tag to the field of the virtual antenna of the tag reading system further comprises moving the virtual tag into or out from the item detection area.

6. The method of claim 1, wherein:
   the field of the virtual antenna is associated with a portal; and
   subjecting the at least one virtual tag to the field of the virtual antenna of the tag reading system further comprises passing the virtual tag through the portal.

7. The method of claim 1, further comprising configuring a property of the virtual tag reading system, the property describing a tag reading capability of the virtual tag reading system.

8. The method of claim 1, further comprising specifying an error value of the virtual tag reading system, the error value estimating a percentage of the at least one virtual tags that the virtual tag reading system fails to read.

9. The method of claim 1, further comprising specifying a field within which the virtual antenna of the virtual tag reading system is operable to read a virtual tag of the plurality of virtual tags.

10. The method of claim 1, wherein inserting the at least one virtual tag further comprises automatically generating a unique tag identifier for each virtual tag of the at least one virtual tags.

11. The method of claim 1, wherein:
    inserting the at least one virtual tag into the virtual environment further comprises grouping the at least one virtual tag into at least one group; and
    subjecting the at least one virtual tag to the field of the virtual antenna of the tag reading system further comprises subjecting each group of the at least one group to the field.

12. The method of claim 1, further comprising inserting a business tool into the virtual environment, the business tool comprising at least one of a virtual pallet, a virtual forklift, a virtual label, and a virtual label printer.

13. The method of claim 1, further comprising displaying the virtual environment using a computer system.

14. A system for emulating a tag reading environment, comprising:
    a database operable to store a virtual tag reading system of a virtual environment, the virtual tag reading system comprising a virtual antenna operable to detect a plurality of virtual tags; and
    a server system coupled to the database and operable to:
    access the virtual tag reading system;

insert at least one virtual tag into the virtual environment;

subject the at least one virtual tag to a field of the virtual antenna; and monitor a response of the virtual tag reading system to the at least one virtual tag.

15. The system of claim 14, wherein the server system is further operable to:

access a tag reading workflow; and execute the tag reading workflow in the virtual environment.

16. The system of claim 14, wherein the virtual tag reading system further comprises a virtual reader that is identified by a physical level identifier.

17. The system of claim 16, wherein the server system is further operable to:

access a tag reading workflow comprising a reader emulator component; and set the reader emulator component to a physical level identifier corresponding to the virtual reader.

18. The system of claim 14, wherein:

the field of the virtual antenna is associated with an item detection area; and the server system is further operable to subject the at least one virtual tag to the field of the virtual antenna of the tag reading system by moving the virtual tag into or out from the item detection area.

19. The system of claim 14, wherein:

the field of the virtual antenna is associated with a portal; and the server system is further operable to subject the at least one virtual tag to the field of the virtual antenna of the tag reading system by passing the virtual tag through the portal.

20. The system of claim 14, wherein the server system is further operable to configure a property of the virtual tag reading system, the property describing a tag reading capability of the virtual tag reading system.

21. The system of claim 14, wherein the server system is further operable to specify an error value of the virtual tag reading system, the error value estimating a percentage of the at least one virtual tags that the virtual tag reading system fails to read.

22. The system of claim 14, wherein the server system is further operable to specify a field within which the virtual antenna of the virtual tag reading system is operable to read a virtual tag of the plurality of virtual tags.

23. The system of claim 14, wherein the server system is further operable to insert the at least one virtual tag by automatically generating a unique tag identifier for each virtual tag of the at least one virtual tags.

24. The system of claim 14, wherein the server system is further operable to:

insert the at least one virtual tag into the virtual environment by grouping the at least one virtual tag into at least one group; and subject the at least one virtual tag to the field of the virtual antenna of the tag reading system by subjecting each group of the at least one group to the field.

25. The system of claim 14, wherein the server system is further operable to insert a business tool into the virtual environment, the business tool comprising at least one of a virtual pallet, a virtual forklift, a virtual label, and a virtual label printer.

26. The system of claim 14, wherein the server system is further operable to initiate display of the virtual environment using a computer system.

27. Software for emulating a tag reading environment, the software embodied in a computer readable medium and when executed operable to:

access a virtual tag reading system of a virtual environment, the virtual tag reading system comprising a virtual antenna operable to detect a plurality of virtual tags;

insert at least one virtual tag into the virtual environment;

subject the at least one virtual tag to a field of the virtual antenna;

monitor a response of the virtual tag reading system to the at least one virtual tag; and storing information associated with the monitored response.

28. The software of claim 27, wherein the software when executed is further operable to:

access a tag reading workflow; and execute the tag reading workflow in the virtual environment.

29. The software of claim 27, wherein the virtual tag reading system further comprises a virtual reader that is identified by a physical level identifier.

30. The software of claim 29, wherein the software when executed is further operable to:

access a tag reading workflow comprising a reader emulator component; and set the reader emulator component to a physical level identifier corresponding to the virtual reader.

31. The software of claim 27, wherein:

the field of the virtual antenna is associated with an item detection area; and the logic is further operable to subject the at least one virtual tag to the field of the virtual antenna of the tag reading system by moving the virtual tag into or out from the item detection area.

32. The software of claim 27, wherein:

the field of the virtual antenna is associated with a portal; and the logic is further operable to subject the at least one virtual tag to the field of the virtual antenna of the tag reading system by passing the virtual tag through the portal.

33. The software of claim 27, wherein the software when executed is further operable to configure a property of the virtual tag reading system, the property describing a tag reading capability of the virtual tag reading system.

34. The software of claim 27, wherein the software when executed is further operable to specify an error value of the virtual tag reading system, the error value estimating a percentage of the at least one virtual tags that the virtual tag reading system fails to read.

35. The software of claim 27, wherein the software when executed is further operable to specify a field within which the virtual antenna of the virtual tag reading system is operable to read a virtual tag of the plurality of virtual tags.

36. The software of claim 27, wherein the software when executed is further operable to insert the at least one virtual tag by automatically generating a unique tag identifier for each virtual tag of the at least one virtual tags.

37. The software of claim 27, wherein the software when executed is further operable to:

insert the at least one virtual tag into the virtual environment by grouping the at least one virtual tag into at least one group; and subject the at least one virtual tag to the field of the virtual antenna of the tag reading system by subjecting each group of the at least one group to the field.

38. The software of claim 27, wherein the software when executed is further operable to insert a business tool into the virtual environment, the business tool comprising at least one of a virtual pallet, a virtual forklift, a virtual label, and a virtual label printer.

39. The software of claim 27, wherein the software when executed is further operable to display the virtual environment using a computer system.

40. A system for emulating a tag reading environment, comprising:
- means for accessing a virtual tag reading system of a virtual environment, the virtual tag reading system comprising a virtual antenna operable to detect a plurality of virtual tags;
- means for inserting at least one virtual tag into the virtual environment;
- means for subjecting the at least one virtual tag to a field of the virtual antenna;
- means for monitoring a response of the virtual tag reading system to the at least one virtual tag; and
- means for storing information associated with the monitored response.

41. A method for emulating a tag reading environment, comprising:
- accessing a virtual tag reading system of a virtual environment, the virtual tag reading system comprising a virtual antenna operable to detect a plurality of virtual tags, the virtual tag reading system further comprising a virtual reader that is identified by a physical level identifier;
- displaying the virtual environment using a computer system;
- configuring a property of the virtual tag reading system, the property describing a tag reading capability of the virtual tag reading system;
- specifying an error value of the virtual tag reading system, the error value estimating a percentage of the at least one virtual tags that the virtual tag reading system fails to read;
- specifying a field within which the virtual antenna of the virtual tag reading system is operable to read a virtual tag of the plurality of virtual tags;
- inserting a business tool into the virtual environment, the business tool comprising at least one of a virtual pallet, a virtual forklift, a virtual label, and a virtual label printer;
- inserting at least one virtual tag into the virtual environment, wherein inserting the at least one virtual tag further comprises:
  - automatically generating a unique tag identifier for each virtual tag of the at least one virtual tags; and
  - grouping the at least one virtual tag into at least one group;
- subjecting the at least one virtual tag to a field of the virtual antenna, the field of the virtual antenna associated with at least one of an item detection area and a portal, the at least one virtual tag subjected to the field by performing at least one of:
  - moving the virtual tag into or out from the item detection area; and
  - passing the virtual tag through the portal; and
  - subjecting each group of the at least one group to the field;
- monitoring a response of the virtual tag reading system to the at least one virtual tag;
- storing information associated with the monitored response;
- accessing a tag reading workflow comprising a reader emulator component; and
- setting the reader emulator component to a physical level identifier corresponding to the virtual reader; and
- executing the tag reading workflow in the virtual environment.

* * * * *